US010452729B1

United States Patent
Keegan et al.

(10) Patent No.: US 10,452,729 B1
(45) Date of Patent: Oct. 22, 2019

(54) SYSTEM AND METHOD FOR USING NETWORK DATA TO IMPROVE EVENT PREDICTIONS

(71) Applicant: HRL Laboratories, LLC, Malibu, CA (US)

(72) Inventors: Matthew S. Keegan, Santa Monica, CA (US); Ryan F. Compton, Los Angeles, CA (US); Tsai-Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 605 days.

(21) Appl. No.: 14/830,289

(22) Filed: Aug. 19, 2015

Related U.S. Application Data

(60) Provisional application No. 62/039,220, filed on Aug. 19, 2014.

(51) Int. Cl.
*G06F 16/00* (2019.01)
*G06F 16/9535* (2019.01)
*G06F 16/958* (2019.01)
*G06F 16/2457* (2019.01)

(52) U.S. Cl.
CPC .... *G06F 16/9535* (2019.01); *G06F 16/24578* (2019.01); *G06F 16/958* (2019.01)

(58) Field of Classification Search
CPC ................................................. G06F 17/30861
USPC .................................................. 707/728, 754
See application file for complete search history.

(56) References Cited

U.S. PATENT DOCUMENTS

| 7,188,078 | B2 * | 3/2007 | Arnett | G06F 21/31 |
| | | | | 705/7.31 |
| 8,635,202 | B2 * | 1/2014 | Wen | G06Q 30/0623 |
| | | | | 707/706 |
| 9,449,097 | B2 * | 9/2016 | Wen | G06Q 30/0623 |
| 2004/0128066 | A1 * | 7/2004 | Kudo | G01C 21/3617 |
| | | | | 701/468 |
| 2011/0261049 | A1 * | 10/2011 | Cardno | G06Q 10/10 |
| | | | | 345/419 |

(Continued)

OTHER PUBLICATIONS

Eytan Bakshy, Jake M. Hofman, Winter A. Mason, and Duncan J. Watts. Everyone's an influencer: Quantifying influence on twitter. In Proceedings of the Fourth ACM International Conference on Web Search and Data Mining, WSDM '11, pp. 65-74, New York, NY, USA, 2011. ACM.

(Continued)

*Primary Examiner* — Hanh B Thai
(74) *Attorney, Agent, or Firm* — Tope-McKay & Associates

(57) ABSTRACT

Described is a system for event prediction on microblogs. In operation, the system receives a social media post stream from a social network to generate and maintain a social network database and an audit trail database. New social media posts are filtered to determine if the new social media posts are related to a possible future event. The new social media posts are compared against the social network database and audit trail database to provide a quality score, the quality score representing a likelihood that at least one of the new social media posts is a true prediction of a future event. If the quality score is determined to be true, the detection is published as a true prediction of a future event.

18 Claims, 17 Drawing Sheets

(56) References Cited

U.S. PATENT DOCUMENTS

| | | | |
|---|---|---|---|
| 2011/0276396 A1* | 11/2011 | Rathod | G06Q 10/00 705/14.49 |
| 2011/0276423 A1* | 11/2011 | Davidson | G06Q 30/06 705/26.1 |
| 2012/0150831 A1* | 6/2012 | Sun | G06F 17/30867 707/706 |
| 2013/0073336 A1* | 3/2013 | Heath | G06Q 30/02 705/7.29 |
| 2014/0279740 A1* | 9/2014 | Wernevi | G06N 99/005 706/12 |
| 2015/0227579 A1* | 8/2015 | Cantarero | G06F 17/30616 707/708 |
| 2015/0242815 A1* | 8/2015 | Velasco | H04W 4/21 705/321 |
| 2015/0341232 A1* | 11/2015 | Hofleitner | H04L 67/306 709/224 |

OTHER PUBLICATIONS

Danah Boyd, Scott Golder, and Gilad Lotan. Tweet, tweet, retweet: Conversational aspects of retweeting on twitter. In Proceedings of the 2010 43rd Hawaii International Conference on System Sciences, HICSS '10, pp. 1-10, Washington, DC, USA, 2010. IEEE Computer Society.

Dan Braha. Global civil unrest: Contagion, self-organization, and prediction. PLoS One, 7(10):e48596, Oct. 2012, pp. 1-9.

M. Cha, H. Haddadi, F. Benevenuto, and K.P. Gummadi. Measuring user in uence in twitter: The million follower fallacy. In 4th International AAAI Conference on Weblogs and Social Media (ICWSM), vol. 10, pp. 10-17, 2010.

Ryan Compton, David Jurgens, and David Allen. Geotagging One Hundred Million Twitter Accounts with Total Variation Minimization. Published on arXiv, Mar. 4, 2015, pp. 1-9.

Ryan Compton, Craig Lee, Jiejun Xu, Luis Artieda-Moncada, Tsai-Ching Lu, Lalindra De Silva, and Michael Macy. Using publicly visible social media to build detailed forcasts of civil unrest. Security Informatics 2014, 3:4, pp. 1-10.

Michael D. Conover, Clayton Davis, Emillo Ferrara, Karissa McKelvey, Filippo Menczer, and Alessandro Flammini. The geospatial characteristics of a social movement communication network. PLoS One, 8(3):e55957, Mar. 2013, pp. 1-8.

Sandra González-Bailón, Javier Borge-Holthoefer, and Yamir Moreno. Broadcasters and Hidden Influentials in Online Protest Diffusion. American Behavioral Scientist, 57(7):943-965, 2013, pp. 946-965.

Sandra González-Bailón, Javier Borge-Holthoefer, Alejandro Rivero, and Yamir Moreno. The Dynamics of Protest Recruitment through an Online Network. Scientic Reports, 1, 2011, pp. 1-7.

David Jurgens. That's what friends are for: inferring location in online communities based on social relationships. In Seventh International AAAI Conference on Weblogs and Social Media, 2013, pp. 273-282.

Haewoon Kwak, Changhyun Lee, Hosung Park, and Sue Moon. What is twitter, a social network or a news media? In Proceedings of the 19th International Conference on World Wide Web. WWW '10, pp. 591-600. New York, NY, USA, 2010. ACM.

Gilad Lotan, Erhardt Grae, Mike Ananny, Devin Ganey, Ian Pearce, and Danah boyd. The Arab Spring—the revolutions were tweeted: Information flows during the 2011 Tunisian and Egyptian revolutions. International Journal of Communication, 5:1375-1405, 2011, pp. 1375-1405.

Miller McPherson, Lynn Smith-Lovin, and James M Cook. Birds of a feather: Homophily in social networks. Annual Review of Sociology, 27(1):415-444, 2001, pp. 415-444.

Alan Mislove, Bimal Viswanath, Krishna P. Gummadi, and Peter Druschel. You are who you know: Inferring user proles in online social networks. In Proceedings of the Third ACM International Conference on Web Search and Data Mining, WSDM '10, pp. 251-260, New York, NY, USA, 2010. ACM.

Aditya Pal and Scott Counts. Identifying topical authorities in microblogs. In Proceedings of the fourth ACM international conference on Web search and data mining—WSDM '11. p. 45, New York, New York, USA. 2011. ACM Press.

Michael J. Welch, Uri Schonfeld, Dan He, and Junghoo Cho. Topical semantics of twitter links. In Proceedings of the Fourth ACM International Conference on Web Search and Data Mining, WSDM '11, pp. 327-336, New York, NY, USA, 2011. ACM.

Jianshu Weng, Ee-Peng Lim, Jing Jiang, and Qi He. Twitterrank: Finding topic-sensative influential twitterers. In Proceedings of the Third ACM International Conference on Web Search and Data Mining, WSDM '10, pp. 261-270, New York, NY, USA, 2010. ACM.

Jianshu Weng and Bu-Sung Lee. Event detection in twitter. In Proceedings of the 5th International AAAI Conference on Weblogs and Social Media (ICWSM 11), 2011, pp. 401-408.

Harshavardhan Achrekar, Avinash Gandhe, Ross Lazarus, Ssu-Hsin Yu, and Benyuan Liu. Predicting flu trends using twitter data. In Computer Communications Workshops (INFOCOM WKSHPS), 2011 IEEE Conference on, pp. 702-707. IEEE, 2011.

Mathieu Bastian, Sebastien Heymann, and Mathieu Jacomy. Gephi: An open source software for exploring and manipulating networks. In Proceedings of the 3rd International AAAI Conference on Weblogs and Social Media (ICWSM 09), 2009, pp. 361-362.

Hila Becker, Mor Naaman, and Luis Gravano. Beyond trending topics: Real-world event identification on twitter. In Proceedings of the 5th International AAAI Conference on Weblogs and Social Media (ICWSM 11), vol. 11 of ICWSM 11, pp. 438-441, 2011.

Mural Demirbas, Mural Ali Bayir, Cuneyt Gurcan Akcora, Yavuz Selim Yilmaz, and Hakan Ferhatosmanoglu. Crowd-sourced sensing and collaboration using twitter. In World of Wireless Mobile and Multimedia Network (WoWMoM), 2010 IEEE International Symposium on a, pp. 1-9. IEEE, 2010.

Nathan Eagle, Michael Macy, and Rob Claxton. Network diversity and economic development. Science, 328 (5981):1029-1031, 2010, pp. 1029-1031.

Matthew S. Gerber, Predicting crime using twitter and kernel density estimation. Decision Support Systems, 61(0) pp. 115-125, 2014.

Jon Kleinberg, Bursty and hierarchical structure in streams. Data Mining and Knowledge Discovery, 7(4) pp. 373-397, 2003.

Sa'sa Petrovic, Miles Osborne, Richard McCreadie, Craig Macdonald, Iadh Ounis, and Luke Shrimpton. Can twitter replace newswire for breaking news. In Seventh International AAAI Conference on Weblogs and Social Media, 2013, pp. 713-716.

Takeshi Sakaki, Makoto Okazaki, and Yutaka Matsuo. Earthquake shakes twitter users: real time event detection by social sensors. In Proceedings of the 19th international conference on World wide web, pp. 851-860. ACM, 2010.

Andranik Tumasjan, Timm O Sprenger, Philipp GSander, and Isabell M Welpe. Electrion forecasts with twitter: How 140 characters reflect the political landscape. Social Science Computer Review, pp. 402-418, 2010.

\* cited by examiner

| Number of Appearances in Audit Trail | Audit Trail Members: Prior to 2013-05-25 | Re-occurrence of Audit Trail Members: Month of 2013-06-01 |
|---|---|---|
| 1 | 7964 (94.6%) | 114 (80.3%) |
| 2 | 354 (4.2%) | 15 (10.6%) |
| 3 | 64 (0.8%) | 5 (3.5%) |
| 4 | 23 (0.3%) | 4 (2.8%) |
| 5 | 6 (0.1%) | 2 (1.4%) |
| > 5 | 10 (0.1%) | 2 (1.4%) |

FIG. 5

| Metric | Description |
|---|---|
| ATNetwork Degree | The degree of a new tweet when placed into the audit trail network |
| Max RTO | The maximum number of previous occurrences in the audit trail of the retweeters of the new tweet |
| Num ATM | The number of retweeters who have previously appeared in the audit trail |
| Proportion ATM | The proportion of retweeters who have previously appeared in the audit trail |
| Sum RTO | The sum of all previous occurrences in the audit trail of the retweeters of the new tweet |

FIG. 10

|       | Degree | Max   | Retweeters | Sum   | Mean  | Median | Proportion |
|-------|--------|-------|------------|-------|-------|--------|------------|
| Set 1 | 0.765  | 0.763 | 0.758      | 0.753 | 0.757 | 0.747  | 0.749      |
| Set 2 | 0.610  | 0.603 | 0.609      | 0.600 | 0.599 | 0.568  | 0.664      |

FIG. 11

| Metric | Description |
|---|---|
| Sum | Sum of Bidirectional mention score contributions from each retweeter |
| Max | Max Bidirectional mention score contribution from each retweeter |
| Number | Number of retweeters are neighbors of audit trail members |
| Proportion | Proportion of retweeters who are neighbors of audit trail members |
| Mean | Mean Bidirectional mention score contributions from each retweeter |
| Median | Median Bidirectional mention score contributions from each retweeter |

FIG. 12

SYSTEM AND METHOD FOR USING NETWORK DATA TO IMPROVE EVENT PREDICTIONS

GOVERNMENT RIGHTS

This invention was made with Government support under Contract Number D12PC00285 awarded by IARPA. The Government has certain rights in the invention.

CROSS-REFERENCE TO RELATED APPLICATIONS

This is a non-provisional patent application of U.S. Provisional Application No. 62/039,220, filed on Aug. 19, 2014, the entirety of which is hereby incorporated by reference.

BACKGROUND OF INVENTION

(1) Field of Invention

The present invention relates to social media posts and, more specifically, to a system for representing an entire record of social interactions on social media in a given community.

(2) Description of Related Art

In practice, mass protest requires the organization of large numbers of people who share an opposition to some social, political or economic restriction or custom and wish to display their joint opposition for the purpose of influencing public opinion or government policy. For the most part, protests remain relatively small and are arranged by a single organization, organizer or a small set of organizations that are tightly knit in their interactions. In rare cases, a grievance can start to span large swaths of civil society and mass demonstration events can break-out into society wide sets of rolling events. Many of these participants are only ephemerally connected to these activities.

However there is often a core set of activists, organizations, journalists and bloggers who are intrinsically involved in mobilizing and documenting unrest sentiment on much longer time-scales. Recently, the speed and flexibility of publication on social media have motivated its use as a tool for the organization and announcement of strikes, protests, marches and other demonstrations to the public (hereinafter collectively referred to as "civil unrest"). For example, Twitter can publish information within seconds of its creation and often circumvents attempts at content filtering. Twitter has recently gained much publicity as an organizational tool for activism after its central role in the 2009 protests in Iran and the 2011 Arab Spring protests.

A great deal of recent work has been directed to finding so-called influential twitterers (see, for example, the List of Incorporated Literature References, Literature Reference Nos. 1, 4, 15, and 17). Other recent work has been directed to studying how a protest is mobilized on social networks and the online interactions of protesters (see Literature Reference Nos. 8 and 9). Additionally, the geographic factors in protest movements have recently been analyzed in Literature Reference Nos. 3 and 7. While such work has been directed to looking at past social interactions and geographic factors, none of the aforementioned work has provided a solution to identifying social relationships and users who are likely to show interest in future protest events.

Thus, a continuing need exists for a system that analyzes relationships and network characteristics of users who appear in past protest posts on social media to identify social relationships and users who are likely to show interest in future protest events.

SUMMARY OF INVENTION

Described is a system for using network data for event prediction. In one aspect, the system includes one or more processors and a memory, the memory being a non-transitory computer-readable medium having executable instructions encoded thereon, such that upon execution of the instructions, the one or more processors perform several operations, including: receiving a social media post stream from a social network; generating and maintaining a social network database and an audit trail database; filtering new social media posts to determine if the new social media posts are related to a possible future event; comparing the new social media posts against the social network database and audit trail database to provide a quality score, the quality score representing a likelihood that at least one of the new social media posts is a true prediction of a future event; and wherein if the quality score is determined to be true, publishing the detection as a true prediction of a future event.

In another aspect, social network database includes a multi-layer representation, including a first layer and a second layer, with inter-layer links connecting the first layer and the second layer.

In yet another aspect, the audit trail database includes one or more audit trails and, the first layer is a post layer that includes nodes and links representing relationships between posts in an audit trail such that two posts are connected if they share a repost.

In another aspect, the second layer is a user layer that represents online relationships among users of the social network.

In yet another aspect, the inter-layer links are defined by authorship of posts or reposts, such that each user is linked to audit trail posts that were either authored or reposted by the user, and wherein each post is linked to all reposts of the post. Further, inter-layer degree of each post is equal to a repost count, such that an inter-layer degree of each user is equal to a number of audit trail posts reposted by the user.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG.

FIG. 5 is a table depicting results of a test, showing the reoccurrence of audit trail members who had retweeted an audit trail tweet that appeared before a particular date;

FIG. 10 is a table listing example functions of two features that can be considered as metrics to discriminate false detections;

FIG. 11 is a table listing an example of ROC area under an ROC curve for retweet network metrics;

FIG. 12 is table listing example metrics according to the principles of the present invention;

DETAILED DESCRIPTION

Figure 1:
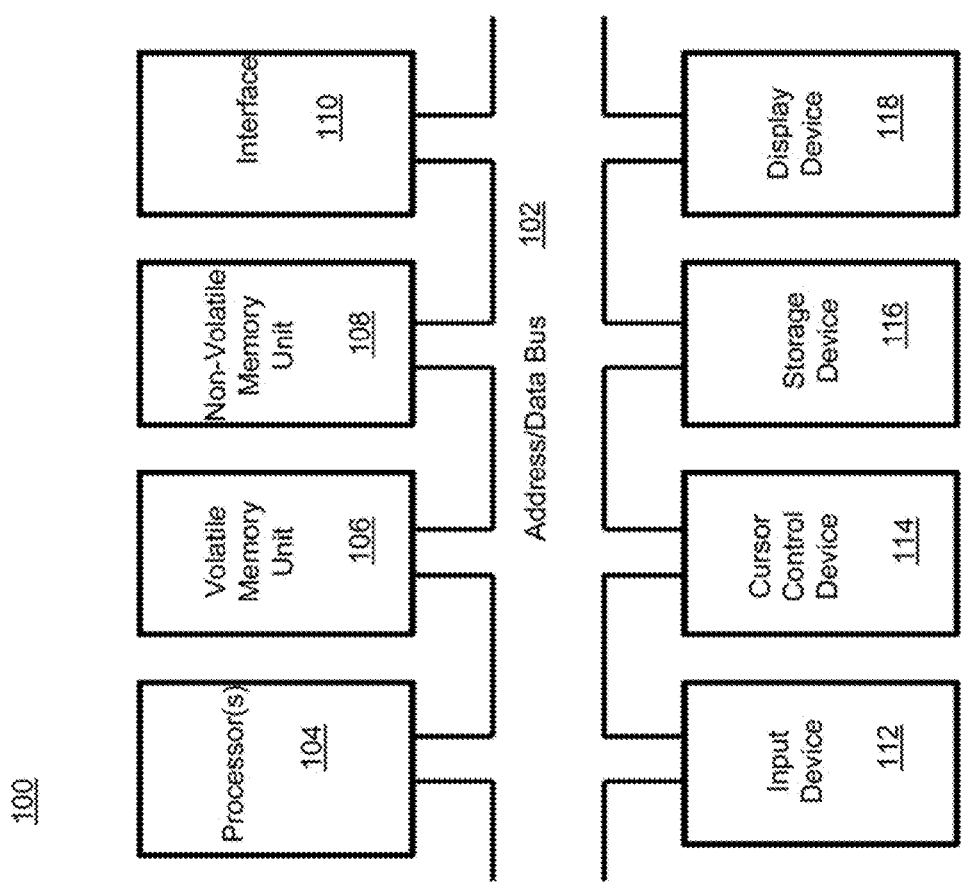
FIG. 1 is a block diagram depicting the components of a system according to some embodiments of the present invention.

The present invention relates to social media posts and, more specifically, to a system for representing an entire record of social interactions on social media in a given community. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiments of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully set forth herein. The references are cited in the application by referring to the corresponding literature reference number.

1. Eytan Bakshy, Jake M. Hofman, Winter A. Mason, and Duncan J. Watts. Everyone's an influencer: Quantifying influence on twitter. In Proceedings of the Fourth ACM International Conference on Web Search and Data Mining, WSDM '11, pages 65-74, New York, N.Y., USA, 2011. ACM.

2. Danah Boyd, Scott Golder, and Gilad Lotan. Tweet, tweet, retweet: Conversational aspects of retweeting on twitter. In Proceedings of the 2010 43rd Hawaii International Conference on System Sciences, HICSS '10, pages 1-10, Washington, D.C., USA, 2010. IEEE Computer Society.

3. Dan Braha. Global civil unrest: Contagion, self-organization, and prediction. PLoS ONE, 7(10):e48596, 10 2012.

4. M. Cha, H. Haddadi, F. Benevenuto, and K. P. Gummadi. Measuring user influence in twitter: The million follower fallacy. In $4^{th}$ International AAAI Conference on Weblogs and Social Media (ICWSM), volume 10, pages 10-17, 2010.

5. Ryan Compton, David Jurgens, and David Allen. Geotagging One Hundred Million Twitter Accounts with Total Variation Minimization. Published on arXiv, Mar. 4, 2015.

6. Ryan Compton, Craig Lee, Jiejun Xu, Luis Artieda-Moncada, Tsai-Ching Lu, Lalindra De Silva, and Michael Macy. Using publicly visible social media to build detailed forecasts of civil unrest. Security Informatics 2014, 3:4
7. Michael D. Conover, Clayton Davis, Emilio Ferrara, Karissa McKelvey, Filippo Menczer, and Alessandro Flammini. The geospatial characteristics of a social movement communication network. PLoS ONE, 8(3): e55957, 03 2013.
8. Sandra González-Bailón, Javier Borge-Holthoefer, and Yamir Moreno. Broadcasters and hidden influentials in online protest diffusion. American Behavioral Scientist, 57(7):943-965, 2013.
9. Sandra González-Bailón, Javier Borge-Holthoefer, Alejandro Rivero, and Yamir Moreno. The Dynamics of Protest Recruitment through an Online Network. Scientific Reports, 1, 2011.
10. David Jurgens. That's what friends are for: inferring location in online communities based on social relationships. In Seventh International AAAI Conference on Weblogs and Social Media, 2013.
11. Haewoon Kwak, Changhyun Lee, Hosung Park, and Sue Moon. What is twitter, a social network or a news media? In Proceedings of the 19th International Conference on World Wide Web, WWW '10, pages 591-600, New York, N.Y., USA, 2010. ACM.
12. Gilad Lotan, Erhardt Graeff, Mike Ananny, Devin Gaffney, Ian Pearce, and danah boyd. The Arab Spring—the revolutions were tweeted: Information flows during the 2011 Tunisian and Egyptian revolutions. International Journal of Communication, 5:1375-1405, 2011.
13. Miller McPherson, Lynn Smith-Lovin, and James M Cook. Birds of a feather: Homophily in social networks. Annual Review of Sociology, 27(1):415-444, 2001.
14. Alan Mislove, Bimal Viswanath, Krishna P. Gummadi, and Peter Druschel. You are who you know: Inferring user profiles in online social networks. In Proceedings of the Third ACM International Conference on Web Search and Data Mining, WSDM '10, pages 251-260, New York, N.Y., USA, 2010. ACM.
15. Aditya Pal and Scott Counts. Identifying topical authorities in microblogs. In Proceedings of the Fourth ACM International Conference on Web Search and Data Mning—WSDM '11, page 45, New York, N.Y., USA, 2011. ACM Press.
16. Michael J. Welch, Uri Schonfeld, Dan He, and Junghoo Cho. Topical semantics of twitter links. In Proceedings of the Fourth ACM International Conference on Web Search and Data Mining, WSDM '11, pages 327-336, New York, N.Y., USA, 2011. ACM.
17. Jianshu Weng, Ee-Peng Lim, Jing Jiang, and Qi He. Twitterrank: Finding topic-sensitive influential twitterers. In Proceedings of the Third ACM International Conference on Web Search and Data Mining, WSDM '10, pages 261-270, New York, N.Y., USA, 2010. ACM.

(2) Principal Aspects

The present invention has three "principal" aspects. The first is system for using network data to improve predictions on microblogs. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2A:
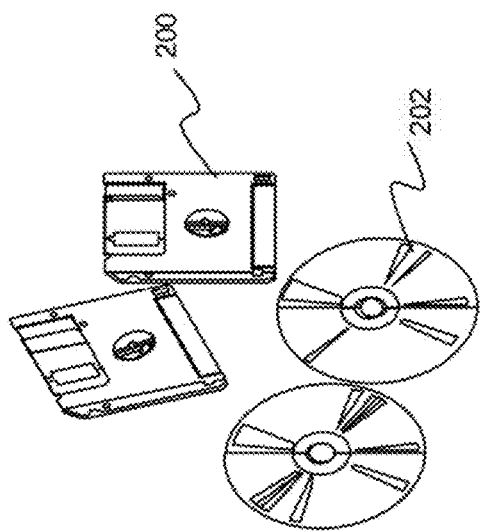
FIG. 2A is an illustration of a computer program product embodying an aspect of the present invention.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Described is a system and method for representing the relationships and dynamics of social media posts and the users related to the posts. A goal of the system is to represent the entire record of social interactions in a given community. The representation is a two-layered graphical model with a post layer and a user layer. The post layer represents the relationships between posts where the relationship is defined by connecting posts that share authorship by a user. Authorship is defined as the original post or as a repost of someone else's post. The user layer represents the social bonds between users of the social network. A cross layer is included that links connect tweets with the users' who authored them. The system then uses the structural features of this representation in a classification framework to determine whether new posts belong to the community.

Although this system was specifically designed for use with microblogging, it should be understood that the invention is not intended to be limited thereto as it can be employed in any network system in which users post data, non-limiting examples of which include Twitter® and the corresponding Tweets®. The system explicitly uses users' histories of involvement in a community as well as the assumption that friends tend to be similar to their friends. The system can be applied, for example, to civil unrest communities and be used to construct networks out of protest announcement posts. Further, the system can be employed to identify influential users on social media and classify new posts as members of the community. Based on such information, the system is useful in any social media analysis program including marketing, product support and customer service.

(4) Specific Details of the Various Embodiments

As noted above, described is a system and method for analyzing relationships and network characteristics of the users who appear in social media posts (e.g., protest Tweets® on Twitter®) to improve event predictions. For example, many of the users who have shown interest in protest Tweets® in the past, are likely to show interest again in the future. Using the system described herein, such a predictive signal can be found in the trail of protest related posts. For example, using a detection algorithm (such as that described in Literature Reference No. 6), the system is operable for detecting messages on social media communicating future protest events. This algorithm can be used to collect an audit trail of protest announcement posts from a number of communities (e.g., 10 countries in Latin America). The system then identifies the users who post or repost (e.g., Retweet®) the audit trail messages and the frequency of each users' appearances. Such users are referred to herein as audit trail members.

Twitter®, for example, is an information diffusion service and thus protest announcements do not necessarily originate from the activists organizing the event. Shortened hyperlinks are commonly used to point other users to announcements or articles published elsewhere on the internet. Therefore, the system does not categorize the detected uses, and instead, focuses on the structural properties of the audit trail. Based on the structural properties, the audit trail members can be used as a sensor set to determine the veracity of newly detected posts to improve event predictions. Note that the approach is agnostic to any actual knowledge of each individual user account and, instead, is based on the occurrence of the user in the audit trail and from graph-based features scraped from social media communication networks.

Figure 2B:
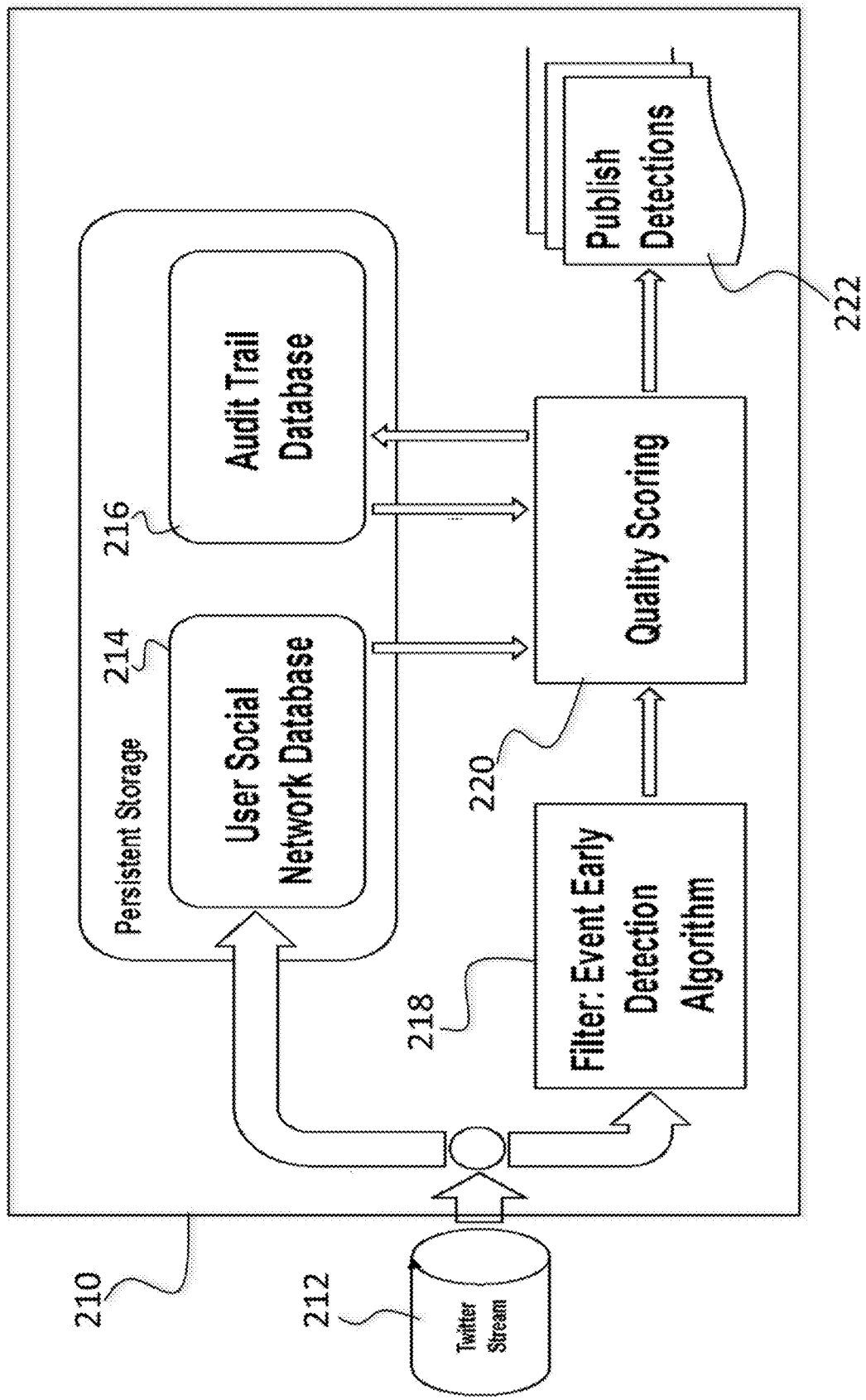
FIG. 2B is an illustration of a flowchart depicting a process for event prediction on microblogs according to the principles of the present invention.

The features above can be incorporated into a system, for example, that provides detections (i.e., publishes detections) as follows. For example and as shown in FIG. 2B, the system 210 receives a social media post stream (e.g., Twitter® stream) 212 and generates and maintains a social network database 214 of post and repost networks (e.g., retweeter and tweet networks) and an audit trail database 216. When new posts are received into the system, a filter 218 (e.g., early detection algorithm) determines if the posts are related to a possible future event. The post is compared against the social network database 214 and audit trail database 216 to provide a quality score 220. The quality score 220 represents a likelihood a particular post is a true indicator (i.e., true prediction) of a future event (e.g., civil unrest). If the quality score is determined to be true, in some embodiments, the results can be provided to a user (i.e., publish detections 222). Publishing detections 222 is, in some embodiments, an event or manifestation external to the system for using network data for event predictions. For example, the results can be rendered for display to a user on a display screen, sent as an alert via a text or email to an administrator or interested party (e.g., journalist, etc.), transmitted to other systems for use therein, posted on a social media site, etc. These aspects are described in further detail below.

(4.1) Data Collection and Event Detection (4.1.1) Detection of Messages discussing Future Civil Unrest Events As noted above, the system is operable for detecting messages on social media communicating future events. It should be understood that the system and method described herein can be utilized for any event. However, for illustrative purposes, the system and method is described with respect to civil unrest, such as that occurring in Latin America. As a non-limiting example, Tweets® were collected for the purpose of civil unrest prediction in 10 countries in Latin America.

Any suitable data event and detection algorithm can be used to determine which posts to collect. As a non-limiting example, the method for determining which Tweets® to collect can be determined using the TUBED algorithm (as described in Literature Reference No. 6 and incorporated herein in its entirety), which extracts desired Tweets® by using the text of the Tweet® alone. Latin America was chosen in this example since social media is available and commonly used, and only two languages need be analyzed for the vast majority of Tweets® in this region.

The TUBED model details how it is possible to examine social media and report on a large number of civil unrest events prior to their occurrence. A distinguishing feature of the approach is the direct extraction and analysis of a small number of highly relevant posts and treating social media as a "news source" rather than a "sensor". Such a detection can occur by directing the TUBED model at Twitter® and Tumblr® messages since high-volume data feeds consisting of public posts on Twitter® and Tumblr® are readily available from several data providers. Further details are provided below.

The TUBED model generates forecasts of the form {date, location, population, event type, probability} from social media. "Population" describes the demographic of the event participants (for example, education, labor, and agriculture). The "event type" gives further detail about the reason for the event (for example, employment, housing, and economic policies). The "date" is the date the event is forecast to occur on. The "location" refers to the city (or geographic location, etc.) where the event is expected to occur, and "probability" is how likely it is that the event will actually happen.

Detections are made by identifying all social media posts that satisfy a number of filters designed to extract only those messages of interest. The text of each post is searched for keywords signifying potential discussion of social unrest and a future date. The message is then passed into a text-orientated logistic regression classifier and is then geographically located according to a message geo-coding algorithm (such as that disclosed in Literature Reference Nos. 5 and 6). Each message is geo-coded by computing the 11-multivariate median of the locations of all users who have retweeted or reposted the message and expressed interest in the message. The location of each user can be determined using a geo-coding algorithm, such as those disclosed in Literature Reference Nos. 5 and 10). Finally, the message is classified into a population group or event type if the message contains words pertaining to that type.

Figures 3A, 3B:
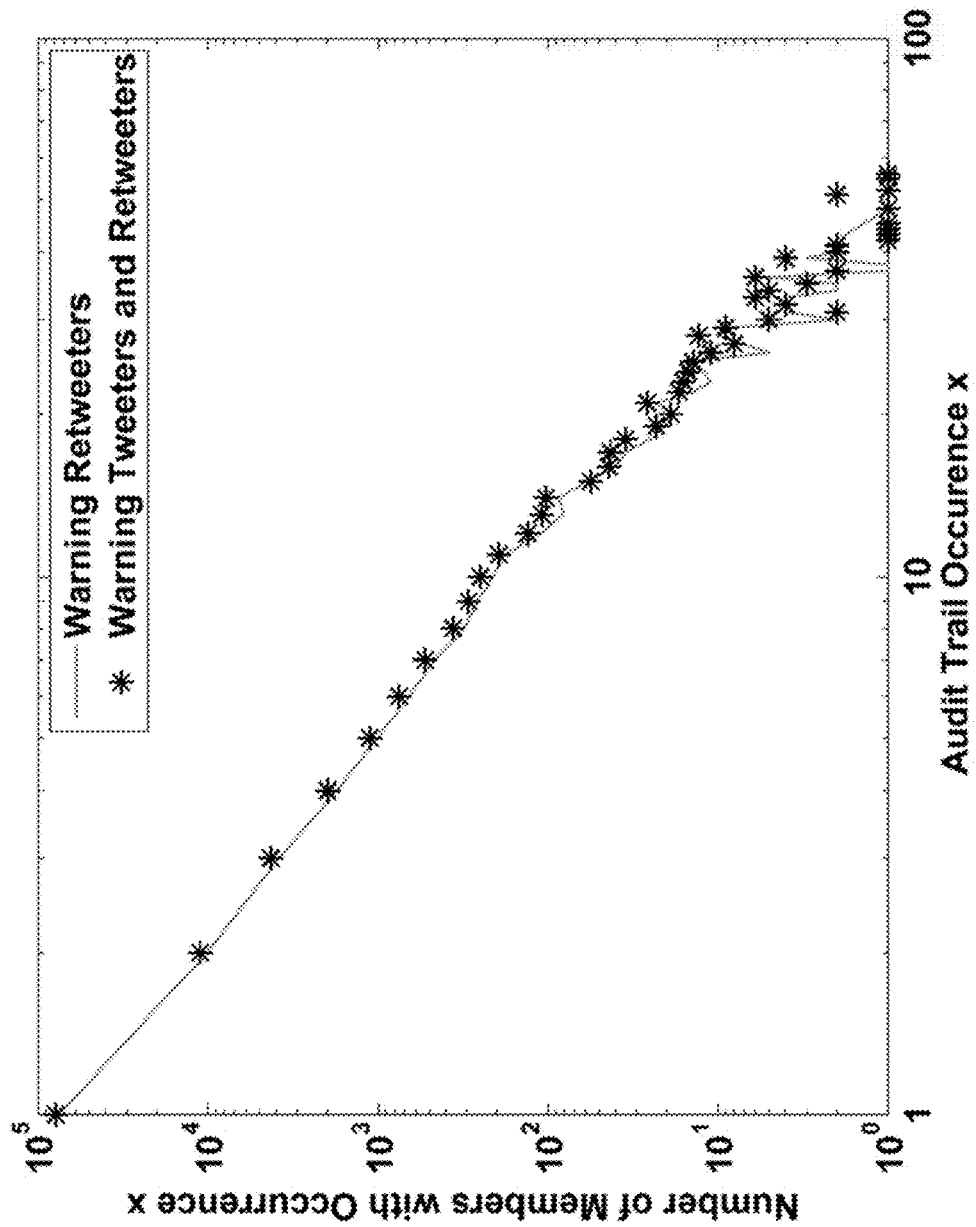
FIG. 3A is a table with an example audit trail count, depicting post, user and repost counts in the audit trail.
FIG. 3B is a graph illustrating user appearances in the audit trail.

For illustrative purposes, reports were collected of the detection results produced using the TUBED model between Jan. 1, 2013 and Jan. 2, 2014. The results are referred to as the audit trail. Included in each audit trail report is the original tweeter ID, as well as the IDs of all users who retweeted the original Tweet® within a timely fashion (usually within 24 hours). For example, FIG. 3A is a table listing the basic counts of tweets and users in the audit trail, while FIG. 3B is a graph generated that illustrates user appearances in the audit trail.

(4.1.2) Data Collection and Evolution of the Detection Algorithm

In order to process microblog posts, the system collects data from publicly available data providers. As a non-limiting example and for illustrative purposes, two sets of publicly available data was collected from data providers, such as that provided by //gnip.com. For example, the Decahose (i.e., see //gnip.com/sources/twitter) was collected. In this example, the Decahose was one-tenth of all Tweets® at random on Twitter®. Second, the PowerTrack3 2 dataset was collected of every Tweet® that mentioned one of the protest related keywords in Spanish or Portuguese that were used for the detection algorithm.

An example alternative to these data sources is to use web-crawling programs to collect as much data as possible from a 2013 social media sites application program interface (API) (e.g., Twitter® API). However, in the Twitter® example, Twitter® imposes rate limits and therefore it is impossible to collect the full Twitter® dataset in real-time.

From January to June of 2013, detections were restricted to the Decahose data. From June onwards, the PowerTrack data was included. The PowerTrack data provided 100% of the keywords of interest, but clearly the Decahose does not. It is clear that there would have been missed detections in the first dataset and that the probability of missing a detection was proportional to the number of retweeters. Later in November, the keyword set was revised and a list of negative keywords was introduced to prevent false detections of events that were not protest related. In addition, a lead time was decreased to include same day detections of events. This again led to an increase in Tweets® included in the audit trail.

(4.2) Audit Trail Network Model of Protest-Related Activity

(4.2.1) Why Resposts (e.g., Retweets)?

There are multiple forms of interaction between users on social media (e.g., Twitter®); follower links, mentions and reposts. Each of these represents a different form of information diffusion and social interaction. As noted by Literature Reference No. 16, follower/following relationships denote the dual role of users on the network, as content consumers and producers. Users follow users who publish posts that they would like to read. In turn the user publishes posts which are read by that particular user's followers. Only about 20% of follower relationships are reciprocated and hence the topology of the follower network is more representative of an information diffusion medium than a social network (see Literature Reference No. 11).

Although there is some evidence of a correlation of a shared topical interest between a user and the users that the original user follows (see Literature Reference No. 17), the topical relevance between a user and those the user retweets is much stronger (see Literature Reference No. 16). This is because the respost function allows a content consumer to actively choose the content of interest or importance and reproduce it for the user's following network, in essence becoming the content producer. The repost function represents the intersection of the content consumer and producer. It has been reported in Literature Reference No. 2 that, from a random sample of tweets, 52% of retweets contain an URL and Literature Reference No. 4 reports as high as 92% of retweets contain an URL. This indicates that retweets are content orientated and informative in nature. These non-local actors may be very active in promoting social unrest movements region-wide and hence may be the best sensors for detecting and predicting social unrest events.

The system according to the principles of the present invention does not differentiate the original poster of a protest announcement with the tweet's set of retweeters. In essence, it is considered a shared authorship of the tweet. The original poster and the set of retweeters jointly represent the promoters of the event. Many of the retweeters may be local supporters of the cause and may be retweeting to encourage their friends and acquaintances to attend the event. However many of the retweeters may be bloggers or non-governmental organizations that support the cause. These non-local actors' intentions may be to further encourage participation and to inform other like-minded users of the events. Therefore the most influential spreaders of information concerning the event, the so-called influencer, may be a retweeter and not an original poster.

The use of Twitter® in the 2011 Arab Spring Uprisings of Tunisia and Egypt in has been well documented (see, for example, Literature Reference No. 12). The authors of the aforementioned reference data-mined tweets pertaining to the uprising movement and classified the involvement of activists, bloggers, journalists and mainstream news sources, as well as other user types, in the Twitter® communications discussing the events of the uprising. It was concluded that individuals were more prominent in disseminating information than organizations, that journalists and activists were the most prominent sources of information and that bloggers and activists were the most frequent retweeters. Moreover there was a strong boomerang effect between the mainstream media and individuals in terms of sharing protest content. In social psychology, the boomerang effect refers to the unintended consequences of an attempt to persuade resulting in the adoption of an opposing position instead. Many of the actors were active in tweets concerning both Tunisia and Egypt, demonstrating that many users are interested in region-wide protest communications.

(4.2.2) Exploiting User Relationships

The audit trail provides data on only a small set of all online users. The question is whether a system can extrapolate information about previously unseen users from their behavior and associations on the social network. Homophily, the property that users who share strong links are also likely to be related with respect to other properties, has been observed consistently in social networks (see, for example, Literature Reference No. 13). This has allowed models that can infer properties about users based on their neighbors (see, for example, Literature Reference No. 14). In particular, close online social bonds have provided extremely accurate models to infer geographic location (see Literature Reference No. 5 and 10). Thus, it is assumed that users who share strong social bonds with users who are embedded in the audit trail may also be likely to have strong interest in social causes and protest events.

In Twitter®, bidirectional mention networks are a good measure of social bonds. These networks require that each user mention each other within a tweet, which is indicative of conversation. The most mentioned users on Twitter are celebrities (see Literature Reference No. 4), implying that unidirectional mention links are more indicative of social attention than social bond, and less likely to be reliable indicators of homophile. An even stronger indication of social bond between two users is the existence of a joint triadic relationship with a third user, since people tend to be friends with many of their friends' friends. Thus, in one embodiment, by restricting the bidirectional mention network by only including closed triadic relationships, it is assumed that the network is strongly correlated with social bond.

(4.2.3) User- and Tweet-Orientated Multi-Layer Network Model

Figure 4B:
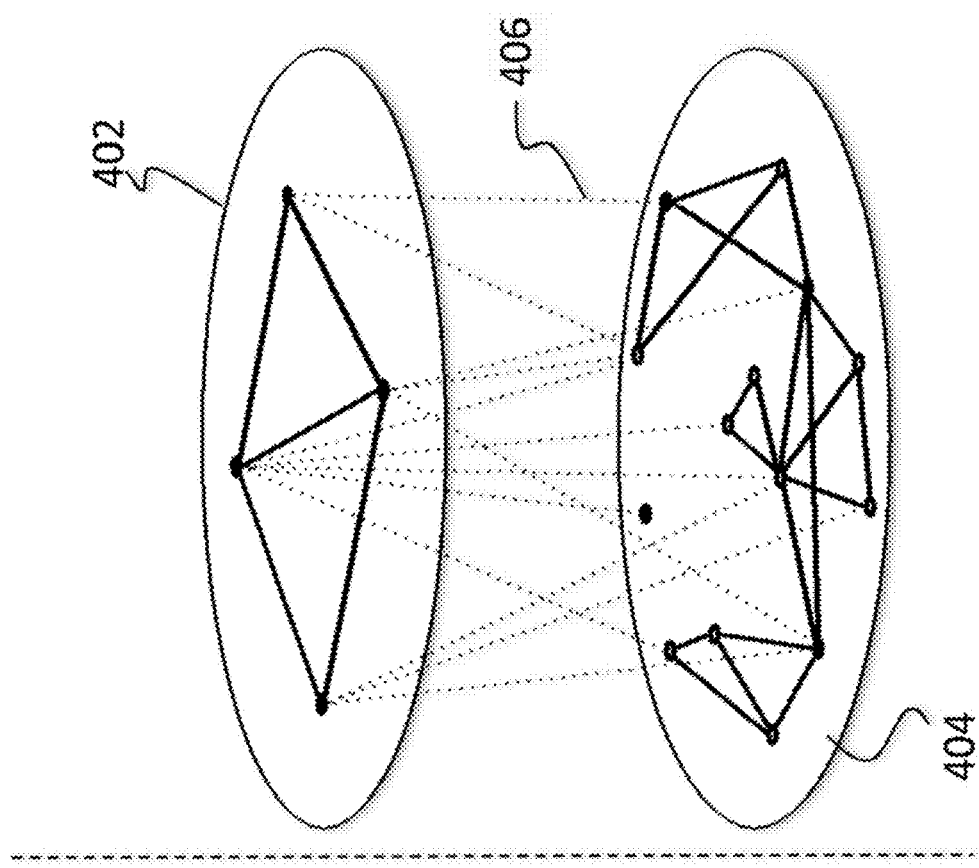
FIG. 4B is an illustrating depicting a multi-layer network.
Figure 4A:
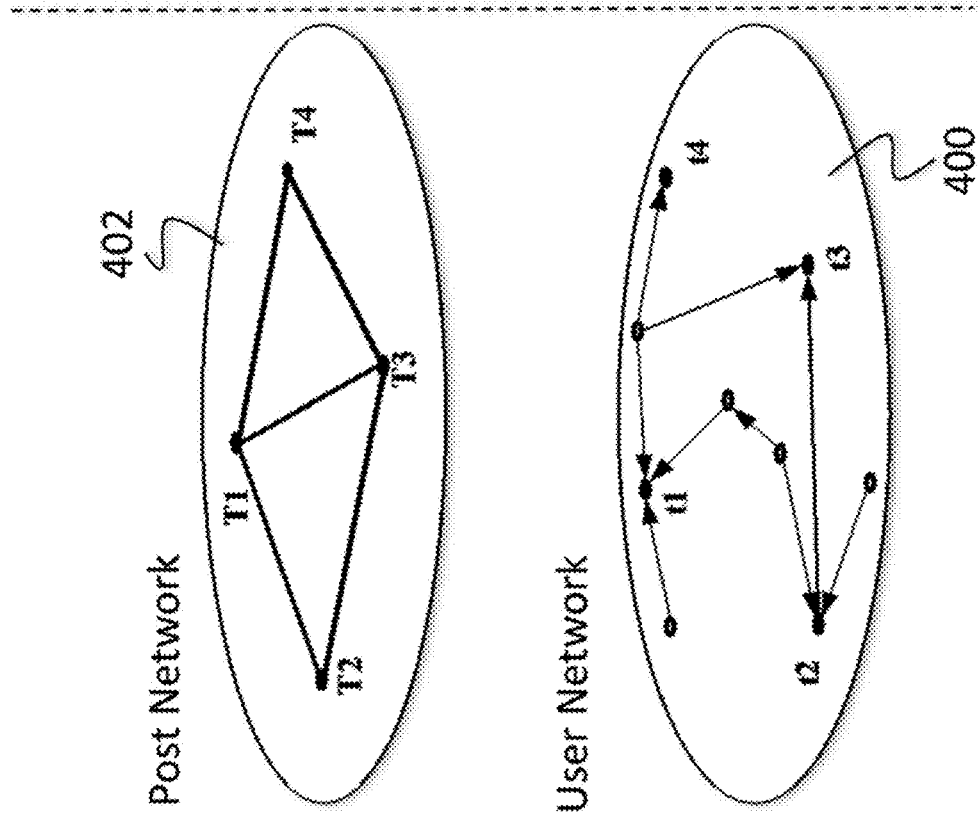
FIG. 4A is an illustration depicting a multi-layer network.
Figure 13A:
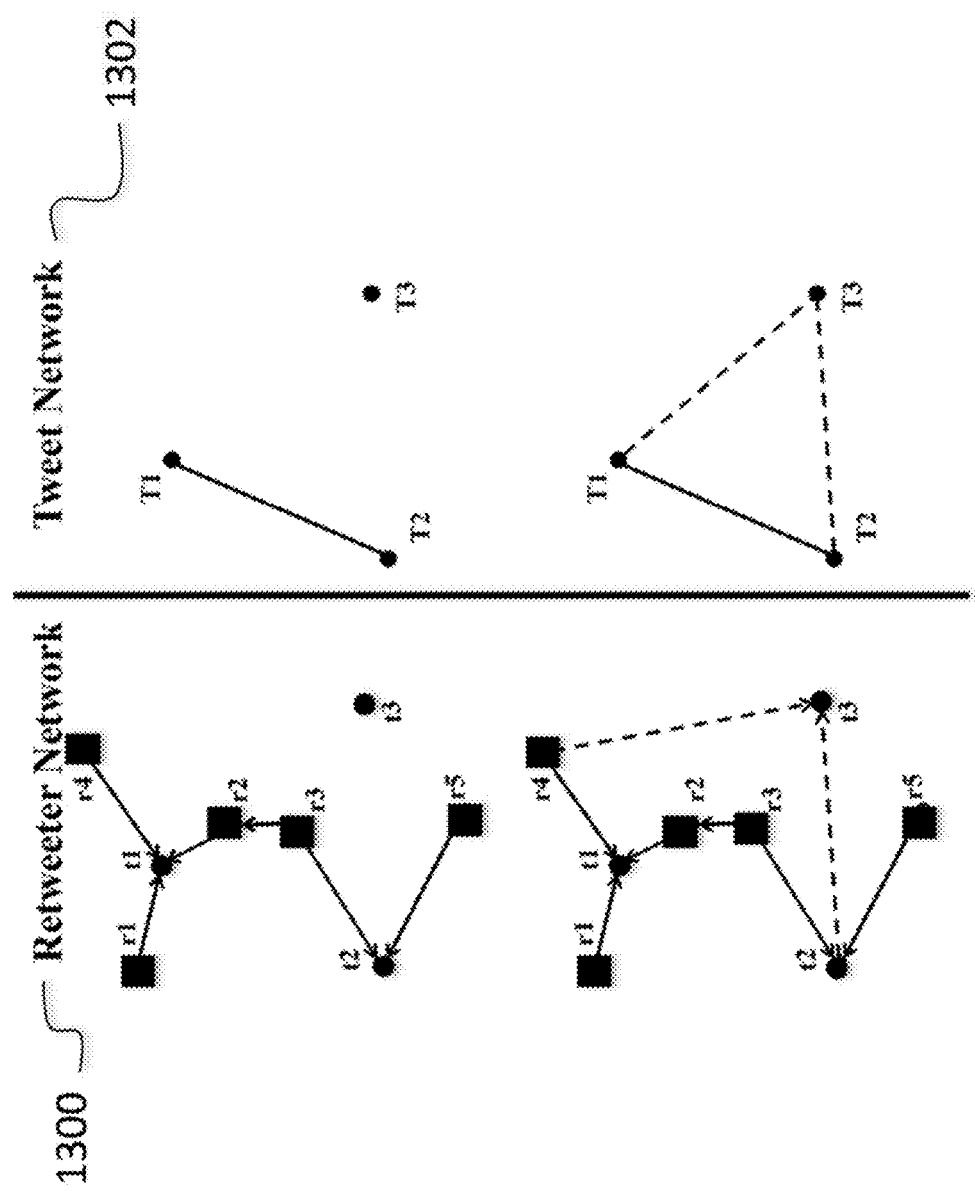
FIG. 13A is an illustration demonstrating dynamics of collapsing a retweeter network to its corresponding tweet network.
Figure 13B:
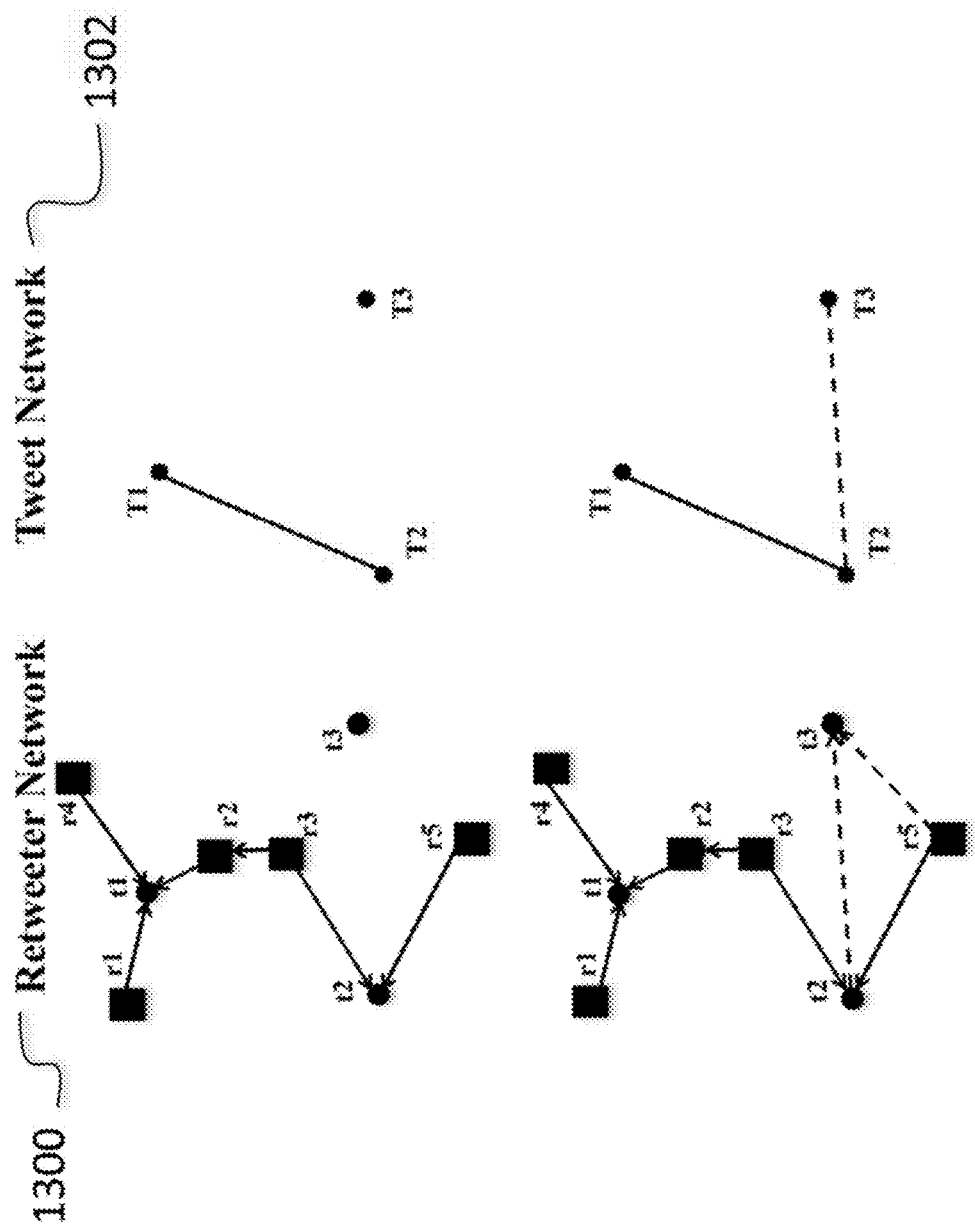
FIG. 13B is an illustration demonstrating dynamics of collapsing a retweeter network to its corresponding tweet network.
Figure 13C:
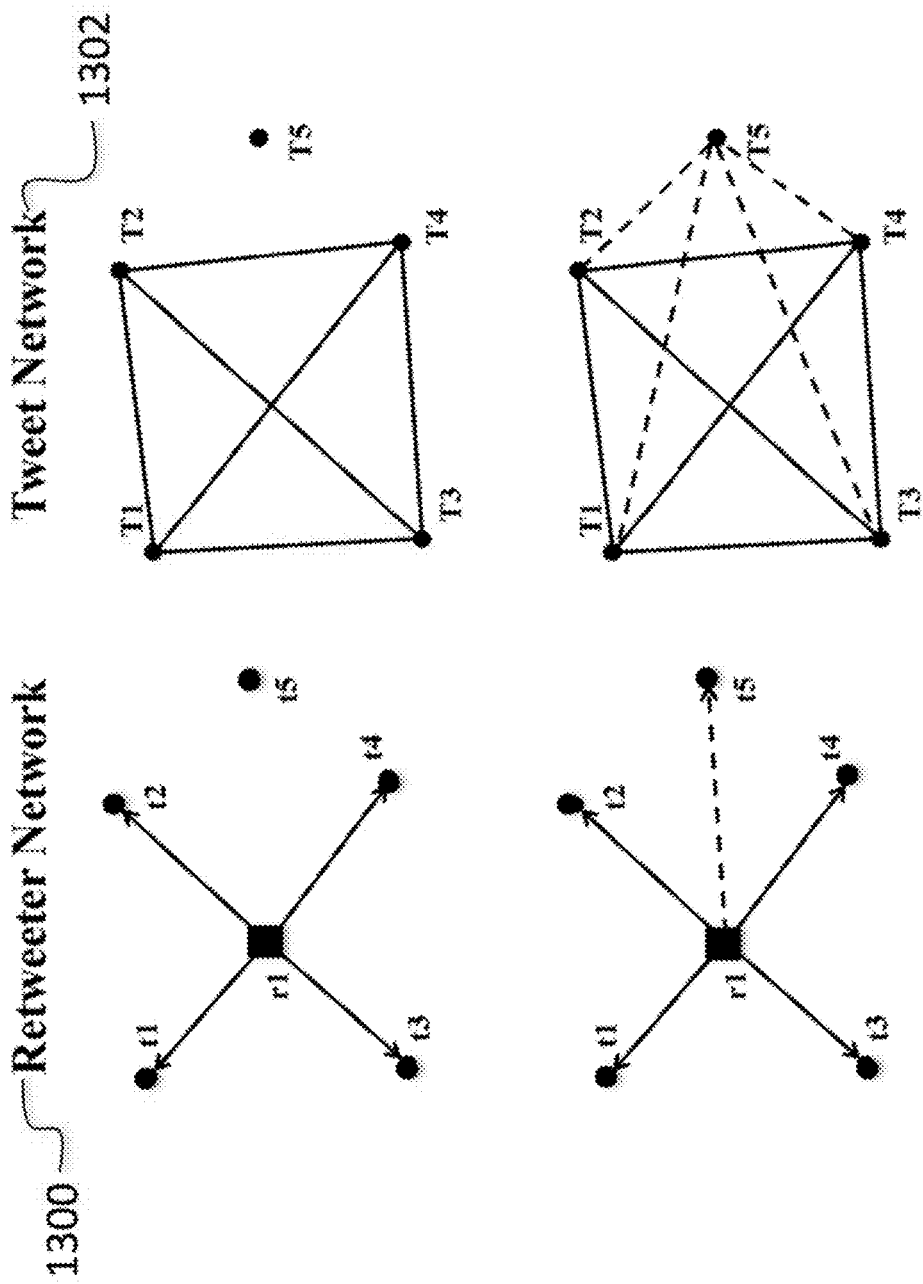
FIG. 13C is an illustration demonstrating dynamics of collapsing a retweeter network to its corresponding tweet network.

To illustrate a relationship between posts and reposts, FIGS. 4A and 4B provide an illustration of a multilayer network (which can be maintained in, for example, a social network database). FIG. 4A illustrates an example of a reposter network on a user layer 400 (e.g., retweeter network as shown in FIGS. 13A through 13C) and a corresponding post network on a post layer 402 (e.g., tweet network as shown in FIGS. 13A through 13C). FIG. 4B illustrates an example of a full multilayer network that as considered by the system described herein, in which the user layer 404 is designated by a social network (for example, a bidirectional mention network with closed triadic relationships). The links 406 between user layer 404 (e.g., retweeter network) and post layer 402 are defined by the corresponding reposter network, shown on the user layer 400 in FIG. 4A.

Thus, a full representation of the post and user relationships can be constructed in a two-layer network. Somewhat similarly structured networks have been proposed by Welch in Literature Reference No. 16; however, as opposed to the prior art, the system herein collapses all reposts (e.g., retweets) of posts (e.g., tweets) into one node and uses the mention networks instead of follower networks. Such a network structure is demonstrated in FIG. 4B.

The first layer is the post layer 402 and it represents a graphical representation of the relationships between posts in the audit trail. Two posts are connected if they share a repost. This network is a condensation of the full reposter network.

The second layer is the user layer 404 represented by the bi-directed mention network and represents the online social relationship between users. Retweets and follower connections are not represented in the user network, since the system does not have access to the follower network and these links are less representative of social bond.

In the formation of the post network (post layer 402), the influence of each individual user is lost. Whether the neighboring posts of a given post are connected through the influence of a single active user, or a number of users, is lost from the network structure. All the predictive features of importance discussed previously can be represented solely within a graph model by combining the post and user networks as layers in a multi-layer network. As noted above, inter-layer links 406 are defined by authorship of post or repost, as demonstrated in FIG. 4B. Namely each user is linked to the audit trail posts that were either authored or reposted by the user. Complementarily, each post is linked to the entire set of reposts of the post. Thus the inter-layer links 406 contain much of the information that is lost in reducing the repost network to the post network. The inter-layer degree of each post is equal to the repost count. The inter-layer degree of each user is equal to the number of audit trail posts reposted by the user.

(4.3) Properties of the Audit Trail

The social network users that occur in the audit trail, either by posting an audit trail post or reposting one, are referred to as audit trail members. Such audit trail data, including the audit trail, post, and members, can be maintain, in some embodiments, in an audit trail database. As can be seen in FIG. 3B, it is observed that the number of occurrences of each member in the audit trail follows an approximate power law distribution. A statistically significant power law fit was found until x=12. This power law nature suggests the existence of Twitter® users who are frequently involved in social unrest discussions.

As noted above, it was assumed that the previous occurrence of users is significant in considering new posts. To test this assumption, an initial experiment was run testing the reoccurrence of audit trail members who had retweeted an audit trail tweet that appeared before a particular date (e.g., June 2013). The results are demonstrated in the table of FIG. 5. The table bins audit trail members by their occurrence count and then lists the number of members from each bin who reoccur in the June audit trail. The only bin that decreases its proportional occurrence is that group of members who previously appear once. Its proportion decreases by 15.2%. Every other bin increases and jointly their proportion increase by 364.81%.

Figure 6:
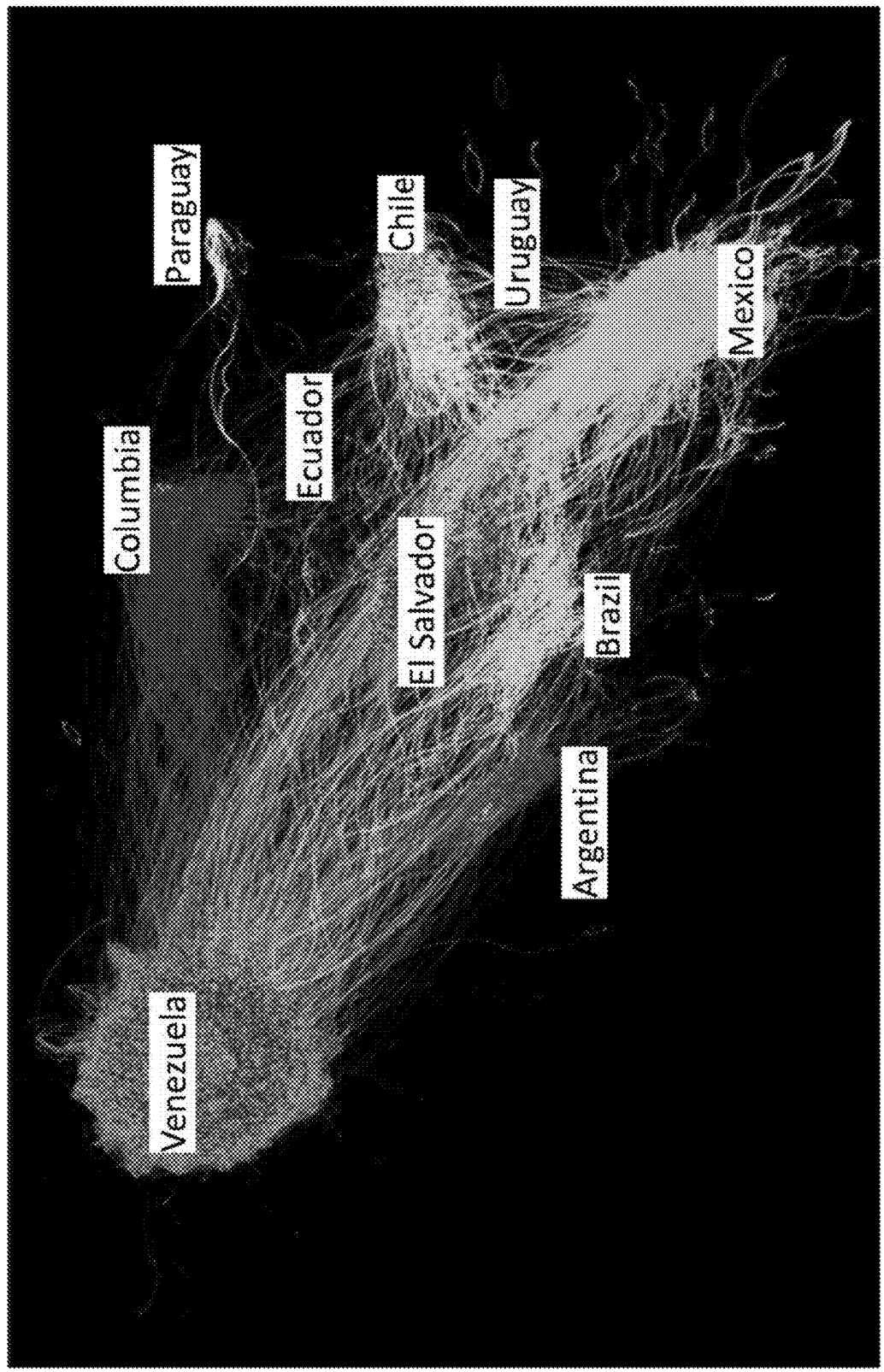
FIG. 6 is an illustration depicting audit trails of a tweet network.

The interest of these users is not necessarily restricted geographically, but can spans across borders throughout a region (e.g., in the Latin American region). The largest component of the tweet network is shown in FIG. 6, where each node is shaded according to the country in which it has been geo-coded. In order of most nodes to least nodes: Venezuela (47.04%), Mexico (18.07%), Colombia (9.54%), Argentina (7.83%), Chile (7.52%), Brazil (6.03%), Paraguay (1.61%), Ecuador (1.28%), Uruguay (0.63%), El Salvador (0.46%).

Although the most significant feature of the network is the tight geographical clustering of the tweets, there are strong connections between these clusters made up of many cross-border retweets. Furthermore the connectivity across the region is quite striking. The component in FIG. 6 makes up 80.5% of the audit trail tweets. This suggests a strong regional connectedness in civil unrest advocacy in the region. Also as can be seen, the audit trail is dominated by tweets originating from Venezuela and to a lesser extent Mexico. Venezuela in particular has seen a great deal of protest in the year preceding collection of the data. The sheer amount in comparison to the other countries is quite striking, especially considering that the study did not include the massive protest movement that has occurred in February 2014. The Twitter® presence of these two countries was quite strong. This can be seen especially by the ratio of retweeters to audit trail tweets geo-coded to Venezuela, which is higher than any of the other countries.

In comparison, Brazil has little presence in the network. This is despite the fact that Brazil saw one of the biggest protest movements in its history in June 2013 during the Confederations Cup. This may be due to the fact that the Portuguese-based detection algorithm is not as well-tuned as the Spanish version. But it is also observed that the online social presence of the movement was strongly centered on Facebook® and there may not have been as large a Twitter® presence.

Figure 7:
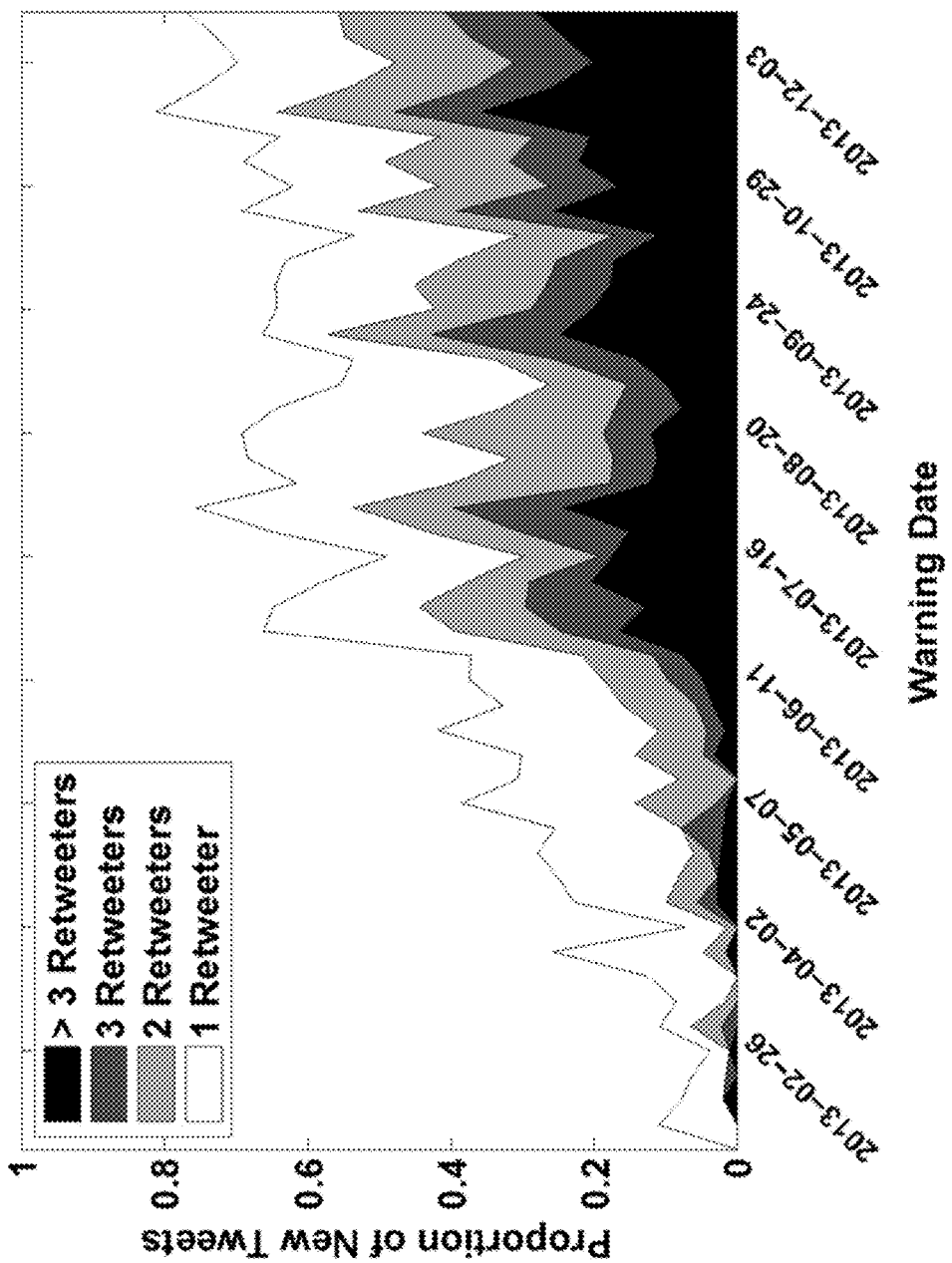
FIG. 7 is an illustration of an example graph with timelines of the proportion of new audit trail tweets that were retweeted by a current audit trail member.
Figure 8:
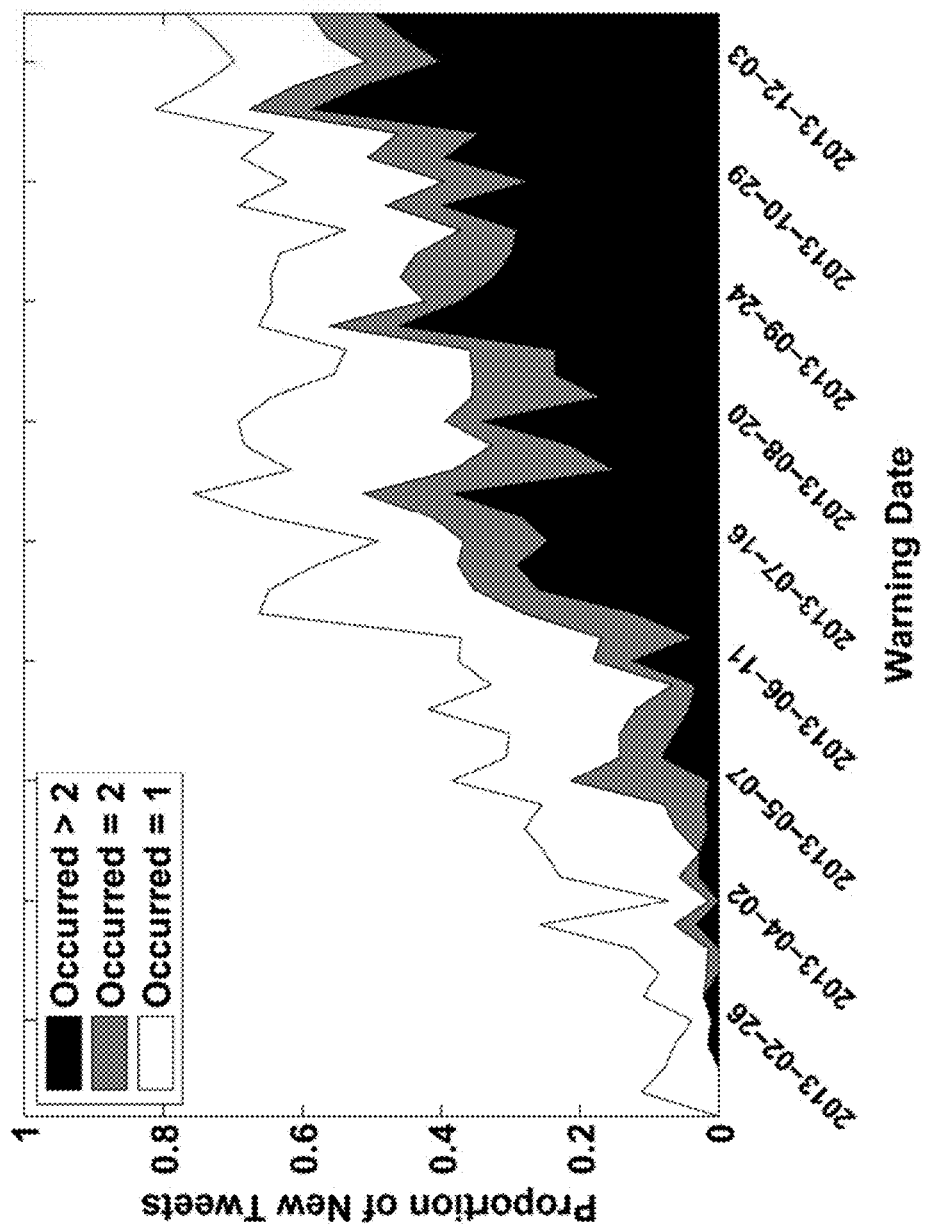
FIG. 8 is an illustration of an example graph with timelines of the proportion of new audit trail tweets that were retweeted by a current audit trail member.
Figure 9:
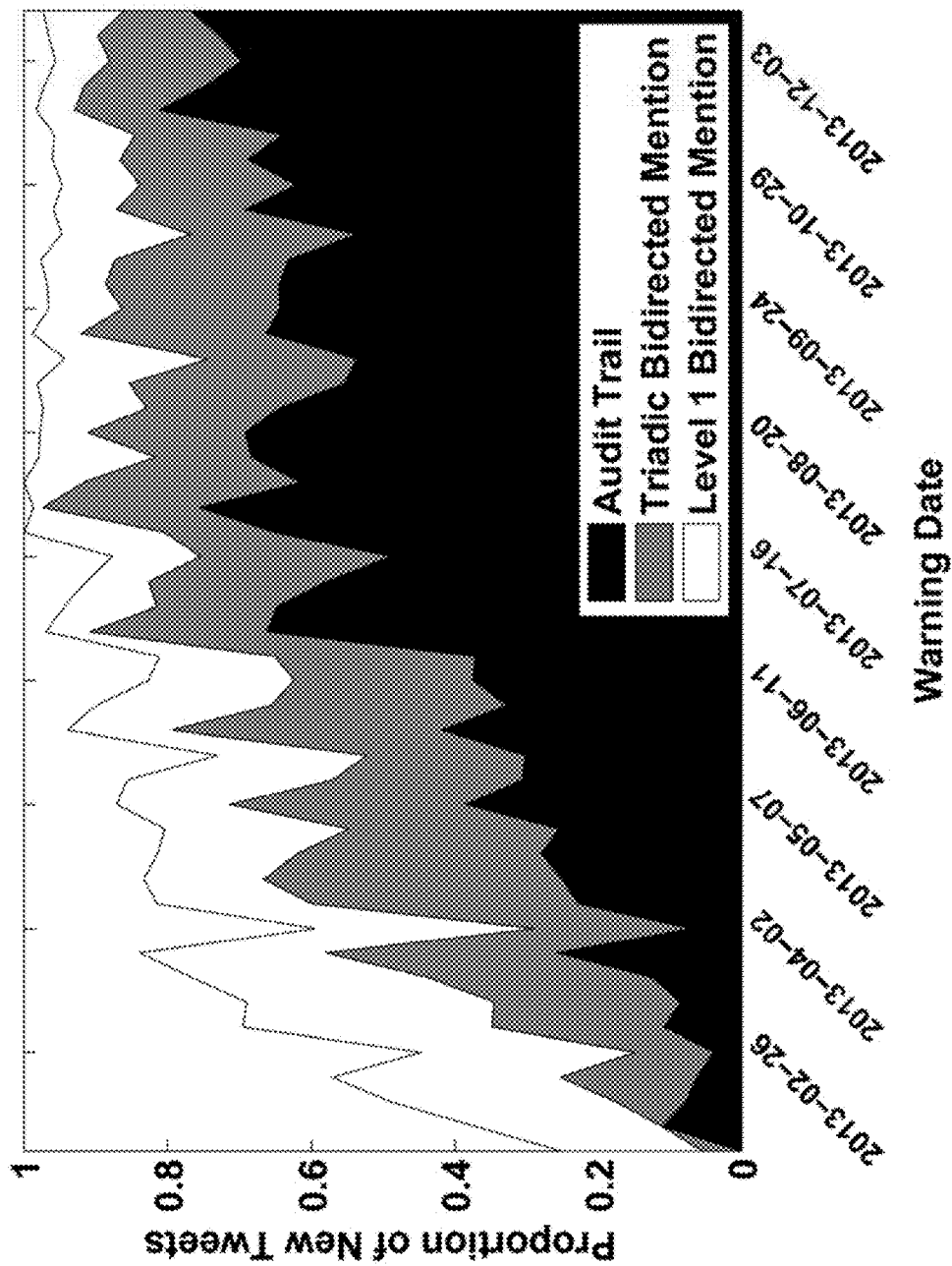
FIG. 9 is an illustration of an example graph with timelines of the proportion of new audit trail tweets that were retweeted by a current audit trail member.

FIGS. 7 through 9 provide example charts with timelines of the proportion of new audit trail tweets that were retweeted by a current audit trail member. For these results at least one week was omitted between the collection of the current audit trail members from old audit trail tweets and their comparison to the new tweets. The purpose of this is to omit users who may be tweeting multiple times in a brief period of time and instead just measure users whose appearances are separated by at least seven days.

FIG. 7 displays how the proportion of new tweets retweeted by audit trail members breaks down by previous occurrence, while FIG. 8 displays the breakdown with respect to number of audit trail members. Both display the increase in the proportion of total tweets retweeted during the collection time period, which progresses from near zero to an average of 68.1% over the last 3 months of data. If the audit trail member set is filtered by the requirement that the number of previous occurrences be at least 2 and 3 respectively, the average proportion of retweeted tweets drops to 50.4% and 40.0% respectively. However the size of the audit trail member set in each case is 16.0% and 6.7% the size of the full set, implying that the member sets at these levels give a significantly stronger predictive ability per user with each respective filtering. Similarly in FIG. 8, it is shown that if the suit trail set is filtered by the requirement that each new tweet be retweeted by at least 2, 3 and 4 current audit trail members respectively, then the proportion of new tweets retweeted drops to 47.7%, 32.15% and 22.15%.

FIG. 9 displays the proportion of tweets that would be retweeted by the audit trail if information about the links on the bidirected mention network were included. The bidirected network used here is the full network constructed from the entire Decahose stream. The two cases included here are firstly the full level 1 bidirected mention network, namely the network one step out from the audit trail, and the same network filtered for closed triad relationships. In the case of the full bidirected network, by late August of 2013 there were weeks where every new audit trail tweet is retweeted by a current audit trail member. Over the last three months of data, 96.4% of new tweets were retweeted by the expanded set; however, the audit trail member set was a mere 3.8% of the size of the level 1 bidirected mention set. Therefore this increase in coverage of the audit trail comes with a huge loss predictive ability per user, although this result is close to the upper bound of coverage. The closed triad network provided an increase of coverage to an average of 87.0% of new tweets with a set of users that was just 17.7% the size of the full level 1 set. This is a big increase over the size of the audit trail member set but significantly smaller than the full level 1 set, thus providing stronger predictive ability per user but without a huge drop in coverage.

(4.4) Classification Analysis of Audit Trail Features

Features that can be generated from the audit trail with respect to the audit trail members can help to distinguish true predictions from false predictions in the civil unrest early detection system (e.g., the TUBED model).

(4.4.1) Ground-Truth Datasets

In order to test the audit trail features as discriminators of true and false protest announcement detections, large sets of detections were manually audited. Two sets of ground-truth were generated. The first set was generated from detections that were made between mid-August 2013 to mid-November 2013. Tweets in which the veracity or lack of veracity of the prediction could definitively be ascertained were assigned to the true or false sets. Based on the false-assigned tweets from this set, the protest keyword list used for detections of the TUBED model was re-assessed and a set of negate keywords were introduced to try to exclude the genre of tweets that were causing the majority of the false detections. These changes were immediately included into the TUBED detection algorithm. The second dataset was generated on the detections made once changes to the detection model were introduced. Again, detections between mid-November and mid-January were manually audited and tweets in which the veracity or lack of veracity of the prediction could definitively be ascertained were assigned to the true or false ground-truth set.

(4.4.2) Retweet Network Metrics

The tweet network is the graphical representation of the audit trail. When new detections are received, the tweet network and the audit trail represent the historical record of each user's previous online expression of support for civil unrest events. Once a new tweet is received from the detection algorithm there are two features that can be utilized from this historical record, the number of retweeters who have previously appeared in the audit trail and the number of times each retweeter has previously occurred in the audit trail. FIG. 10, for example, is a table listing example functions of two features that can be considered as metrics to discriminate false detections. Further, FIG. 11 is a table illustrating results from receiver operating characteristic (ROC) curves and the corresponding area under the curve scores of the listed metrics. A set of scores is displayed for each of the ground truth datasets. For both datasets, the general difference between the scores is small. The one exception is the metric that measures the proportion of retweeters who have appeared before. The proportion metric performs worse on the first dataset but much better on the second.

Apart from the fact that the metrics measure similar quantities, the similarity of the other metrics' scores is partially explained by the fact that the so many tweets have not been retweeted by an audit trail member. In the first dataset, it was determined that about 70% of the true set and about 25% of the false set and in the second dataset about 75% of the true set and 65% of the false set have been retweeted by audit trail members. Information can be gleamed for the remaining tweets using other network features, such as the inferred social network, without data-mining users for more information. The difference in the performance of the proportion metric is explained by the fact that it is dependent on the number of non-recurring retweeters, which is a variable that is not represented by the other metrics.

Note that although not used, there are other potential features that could have been extracted from the tweets in the audit trail, such as the temporal information of the audit trail, the contents of each Tweet's text (further than the civil unrest keyword detection) or the contents of hyperlinks in the tweets.

(4.4.3) Social Network Metrics

To exploit homophily for the purpose of classification, bidirectional mention networks can be built from both the Decahose and Powertrack streams. The Powertrack data is considerably smaller than the Decahose data. However the Powertrack data contains the protest keywords that were identified as key indicators of a protest message. Therefore a link on the bidirectional Powertrack data may have a stronger correlation of homophily between two users with respect to their feelings on social unrest topics.

The key structural features on the user network are the number of audit trail members each user neighbors and the number of mentions between users. For a tweet, the total mentions between each user and neighboring audit trail members are added together, which is then combined with all the mentions of the tweet's retweeters using some aggregation metric.

A non-limiting example of such metrics are displayed in the table of FIG. 12. It is noted that in generating ROC curves for the metrics on both datasets that the area under the curve scores is better than the scores for the retweeter metrics. The ROC analysis shows that the sum of mentions, the max number of mentions and the mean number of mentions perform similarly for each test case and are consistently the best scoring. The one exception is the median of mentions which performs the best on the Powertrack dataset 2 test. Interestingly the Powertrack data performed better that the network generated from all Decahose stream, although the Decahose network has considerably more information. Another interesting finding is that if the network is filtered for triadic closures then the metrics perform worse. In the Decahose network this may be due to the fact that the system only has access to 10% of tweets and thus there are many bi-directed mention relationships that are missed, which in turn means that many significant links may be filtered out due to the lack of triadic closure. The ROC calculations were run on both weighted and unweighted representations of the user network, where the weight is equal to the minimum number of mentions made by one user of the other user. Interestingly, it was noted that the unweighted network representation gave better classification results for both mention networks and for all metrics. It is possible that a weighted network may give better results if a nonlinear function of the number of mentions is applied as the weight of each link.

(4.4.4) Condensing a Retweeter Network into a Tweet Network

As noted above, the system herein condenses a retweeter network into a tweet network. For example, FIGS. 13A through 13C demonstrate simple dynamics of collapsing a retweeter network 1300 (a graphical representation connecting users by their retweet chains) to its corresponding tweet network 1302 (a graphical representation connecting tweets that share authors or retweeters). The retweet networks 1300 are simple to avoid ambiguities in the retweet chain. In the retweet network 1300, original tweeters are depicted as solid circles and are denoted by ti. The corresponding tweets in the tweet network are denoted Ti with matching numbering. Retweeters have solid boxes and are denoted by ri. Solid arrows in the retweet network 1300 denote retweets while dashed arrows in the retweet network 1300 represent new retweets. Dashed lines in the tweet network 1302 are the new links between tweets resulting from the new retweets.

A network of tweets is constructed by connecting tweets which share a user either as the original tweeter or as a retweeter. The system and process makes no distinction between the original tweeter and a retweeter of the tweet. The tweet network is a reduction of the retweeter network, as demonstrated in FIGS. 11A through 11C. This reduction takes place for two reasons. Firstly, it is often the case that many retweets are simply retweets of previous retweets and not retweets of the original tweet. This exact retweet chain is often not readily available and difficult to reconstruct, and reducing to a tweet network removes the necessity of finding the exact relationship of retweeters and how the retweets propagate. Instead each retweeter is simply connected to the original tweet. Secondly, two tweets may appear to be distinct but may contain the exact same text (but may differ in metatext, such as links, that is cleaned from the tweet text). This often occurs when one tweeter simply copies the text from another tweet, and retweets it. Such copied tweets are treated the same as if they were the same tweet. The tweet network naturally handles such cases, since no distinction is made between original tweeters and retweeters.

An example utility of the tweet network can be analyzed as follows. Consider a tweet T representing a new warning and newly added to the network. Assume that at the time of detection, T has been retweeted (or tweeted) by n users already appearing in the audit trail. The set of audit trail retweeters are denoted by $\{r_i\}$ for i=1, . . . , n, and the number of previous appearances of $r_i$ are denoted by $c_i$. Then the degree of T in the tweet network obeys the set of inequalities:

$$\max_i c_i \le deg(T) \le \sum_i c_i.$$

It should be noted that being retweeted by a user who has appeared multiple times in the audit trail increases the probability of the tweet representing a true positive indicator of a civil unrest warning. Thus, by the first inequality, the degree of T is a good measure of T's veracity as an indicator.

Moreover, there is good reason to suggest that the a strict relationship in the second inequality gives better performance as a measure of T as an indicator than simply using $$\sum_i c_i.$$

Figure 14:
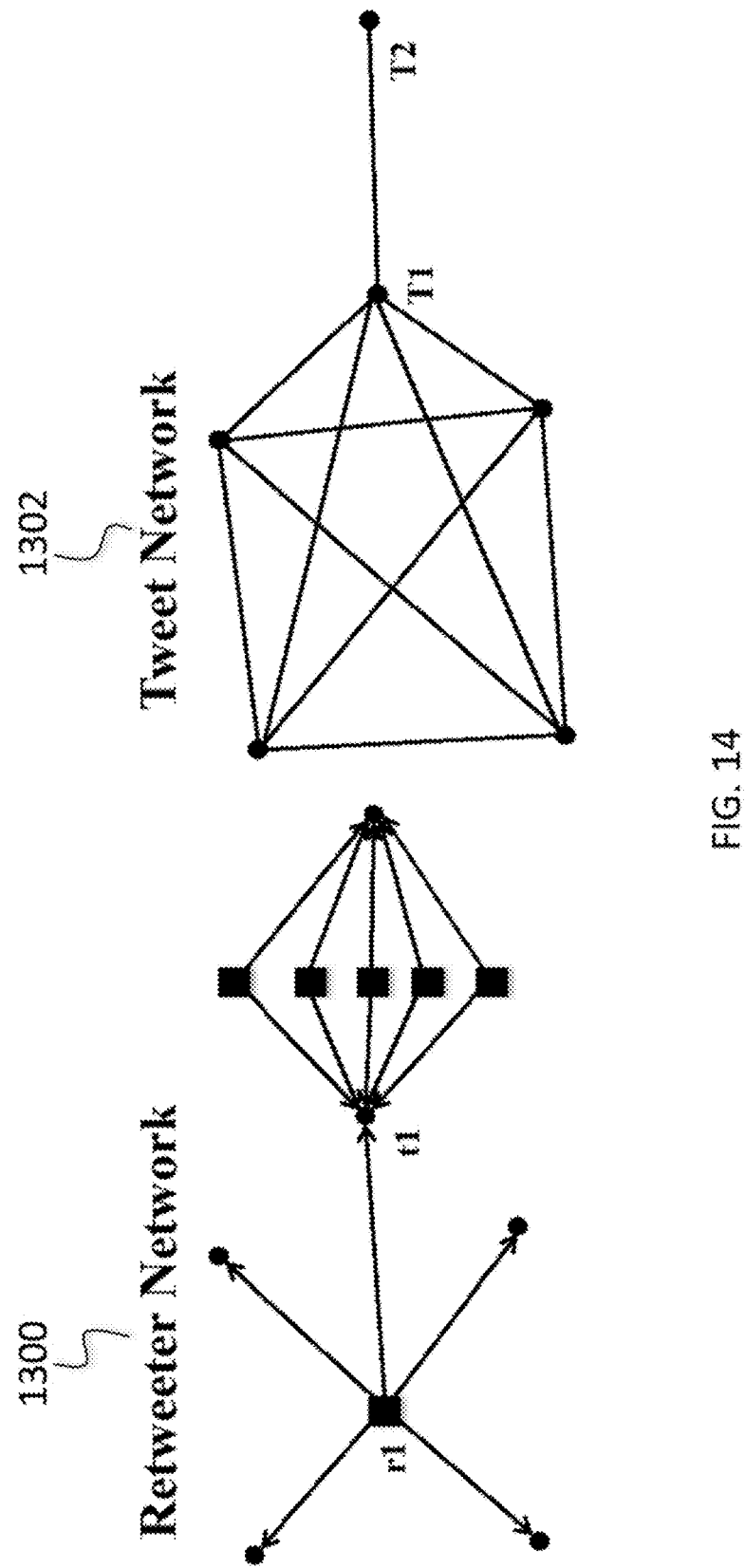
FIG. 14 is an illustration of a retweeter network and its corresponding tweet network, demonstrating a different in tweet network degree between being retweeted by one audit trail retweeter, who has occurred several times before in the audit trail, and being retweeted by many audit trail retweeters, who have only appeared before by retweeting the same tweet.

This follows from the fact that it is more important to be retweeted by a few users connected to a diverse set of audit trail tweets, than a lot of users jointly connected to just one audit trail tweet. For example, FIG. 14 is an illustration of a retweeter network 1300 and its corresponding tweet network 1302, demonstrating a different in tweet network degree between being retweeted by one audit trail retweeter, who has occurred several times before in the audit trail, and being retweeted by many audit trail retweeters, who have only appeared before by retweeting the same tweet.

It certainly is the case that user's do not restrict their tweets to single topics of interest. Consider a user who shares an interest in both a protest movement and a soccer team, denoted by r1 in FIG. 14. Assuming the protest movement is very active, the user may appear many times in the audit trail promoting several protest events. Consider the case that the user additionally retweets the tweet T1 concerning a soccer match that the event detection algorithm incorrectly classifies as a civil unrest warning. The degree of this soccer tweet will be relatively high and the tweet will be scored high as a likely tweet signifying a civil unrest event. The soccer tweet T1 may have other retweeters but they are unlikely to also be interested in civil unrest events. Now if an additional soccer tweet T2 is detected as a civil unrest event, it may share many retweeters with T1 due to their shared interest. In this case it is likely that T2 will have small degree in the tweet network. For instance in FIG. 14, T2 has degree 1 in the tweet network but $$\sum_i c_i$$

will have value 5. However, if the 5 retweeters of T2 had instead retweeted 5 distinct audit trail tweets, then it would be far more likely that T2 is a legitimate civil unrest-related tweet. In this case, the degree of T2 is 5. Thus, degree in the audit trail network acts as a better indicator of a civil unrest warning than the total sum of retweets of all retweeters.

What is claimed is:

1. A system for using internet social network data for event predictions, the system comprising:
one or more processors and a memory, the memory being a non-transitory computer-readable medium having executable instructions encoded thereon, such that upon execution of the instructions, the one or more processors perform operations of:
receiving an internet social media post stream from an internet social network;
generating and maintaining a social network database and an audit trail database;
filtering new social media posts on the internet social network to extract new social media posts related to possible future civil unrest by searching text in each new social media post for keywords related to social unrest and a future date, passing the new social media posts through a text-oriented logistic regression classifier, and geo-coding the new social media posts, wherein the new social media posts are geo-coded based on an l1-multivariate median of locations of all users who have shared the new social media posts;
comparing the new social media posts against the social network database and audit trail database to provide a quality score, the quality score representing a likelihood that at least one of the new social media posts is a true prediction of future civil unrest; and
wherein if the quality score is determined to be true, publishing the detection as a true prediction of future civil unrest.

2. The system as set forth in claim 1, wherein the social network database includes multi-layer representation, including a first layer and a second layer, with inter-layer links connecting the first layer and the second layer.

3. The system as set forth in claim 2, wherein the audit trail database includes one or more audit trails and wherein the first layer is a post layer that includes nodes and links representing relationships between posts in an audit trail such that two posts are connected if they share a repost.

4. The system as set forth in claim 2, wherein the second layer is a user layer that represents online relationships among users of the social network.

5. The system as set forth in claim 2, wherein the inter-layer links are defined by authorship of posts or reposts, such that a user is linked to audit trail posts that were either authored or reposted by the user, and wherein each post is linked to all reposts of the post.

6. The system as set forth in claim 5, wherein an inter-layer degree of each post is equal to a repost count, such that an inter-layer degree of each user is equal to a number of audit trail posts reposted by the user.

7. A computer program product for social unrest prediction on microblogs using internet social network data, the computer program product comprising:
  a non-transitory computer-readable medium having executable instructions encoded thereon, such that upon execution of the instructions by one or more processors, the one or more processors perform operations of:
    receiving an internet social media post stream from an internet social network;
    generating and maintaining a social network database and an audit trail database;
    filtering new social media posts on the internet social network to extract new social media posts related to possible future civil unrest by searching text in each new social media post for keywords related to social unrest and a future date, passing the new social media posts through a text-oriented logistic regression classifier, and geo-coding the new social media posts, wherein the new social media posts are geo-coded based on an l1-multivariate median of locations of all users who have shared the new social media posts;
    comparing the new social media posts against the social network database and audit trail database to provide a quality score, the quality score representing a likelihood that at least one of the new social media posts is a true prediction of future civil unrest; and
    wherein if the quality score is determined to be true, publishing the detection as a true prediction of future civil unrest.

8. The computer program product as set forth in claim 7, wherein the social network database includes a multi-layer representation, including a first layer and a second layer, with inter-layer links connecting the first layer and the second layer.

9. The computer program product as set forth in claim 8, wherein the audit trail database includes one or more audit trails and wherein the first layer is a post layer that includes nodes and links representing relationships between posts in an audit trail such that two posts are connected if they share a repost.

10. The computer program product as set forth in claim 8, wherein the second layer is a user layer that represents online relationships among users of the social network.

11. The computer program product as set forth in claim 8, wherein the inter-layer links are defined by authorship of posts or reposts, such that a user is linked to audit trail posts that were either authored or reposted by the user, and wherein each post is linked to all reposts of the post.

12. The computer program product as set forth in claim 11, wherein an inter-layer degree of each post is equal to a repost count, such that an inter-layer degree of each user is equal to a number of audit trail posts reposted by the user.

13. A computer implemented method for social unrest prediction on microblogs using internet social network data, the method comprising an act of:
  causing one or more processors to execute instructions encoded on a non-transitory computer-readable medium, such that upon execution, the one or more processors perform operations of:
    receiving an internet social media post stream from an internet social network;
    generating and maintaining a social network database and an audit trail database;
    filtering new social media posts on the internet social network to extract new social media posts related to possible future civil unrest by searching text in each new social media post for keywords related to social unrest and a future date, passing the new social media posts through a text-oriented logistic regression classifier, and geo-coding the new social media posts, wherein the new social media posts are geo-coded based on an l1-multivariate median of locations of all users who have shared the new social media posts;
    comparing the new social media posts against the social network database and audit trail database to provide a quality score, the quality score representing a likelihood that at least one of the new social media posts is a true prediction of future civil unrest; and
    wherein if the quality score is determined to be true, publishing the detection as a true prediction of future civil unrest.

14. The computer implemented method as set forth in claim 13, wherein the social network database includes a multi-layer representation, including a first layer and a second layer, with inter-layer links connecting the first layer and the second layer.

15. The computer implemented method as set forth in claim 14, wherein the audit trail database includes one or more audit trails and wherein the first layer is a post layer that includes nodes and links representing relationships between posts in an audit trail such that two posts are connected if they share a repost.

16. The computer implemented method as set forth in claim 14, wherein the second layer is a user layer that represents online relationships among users of the social network.

17. The computer implemented method as set forth in claim 14, wherein the inter-layer links are defined by authorship of posts or reposts, such that a user is linked to audit trail posts that were either authored or reposted by the user, and wherein each post is linked to all reposts of the post.

18. The computer implemented method as set forth in claim 17, wherein an inter-layer degree of each post is equal to a repost count, such that an inter-layer degree of each user is equal to a number of audit trail posts reposted by the user.

* * * * *